United States Patent Office 3,453,052
Patented July 1, 1969

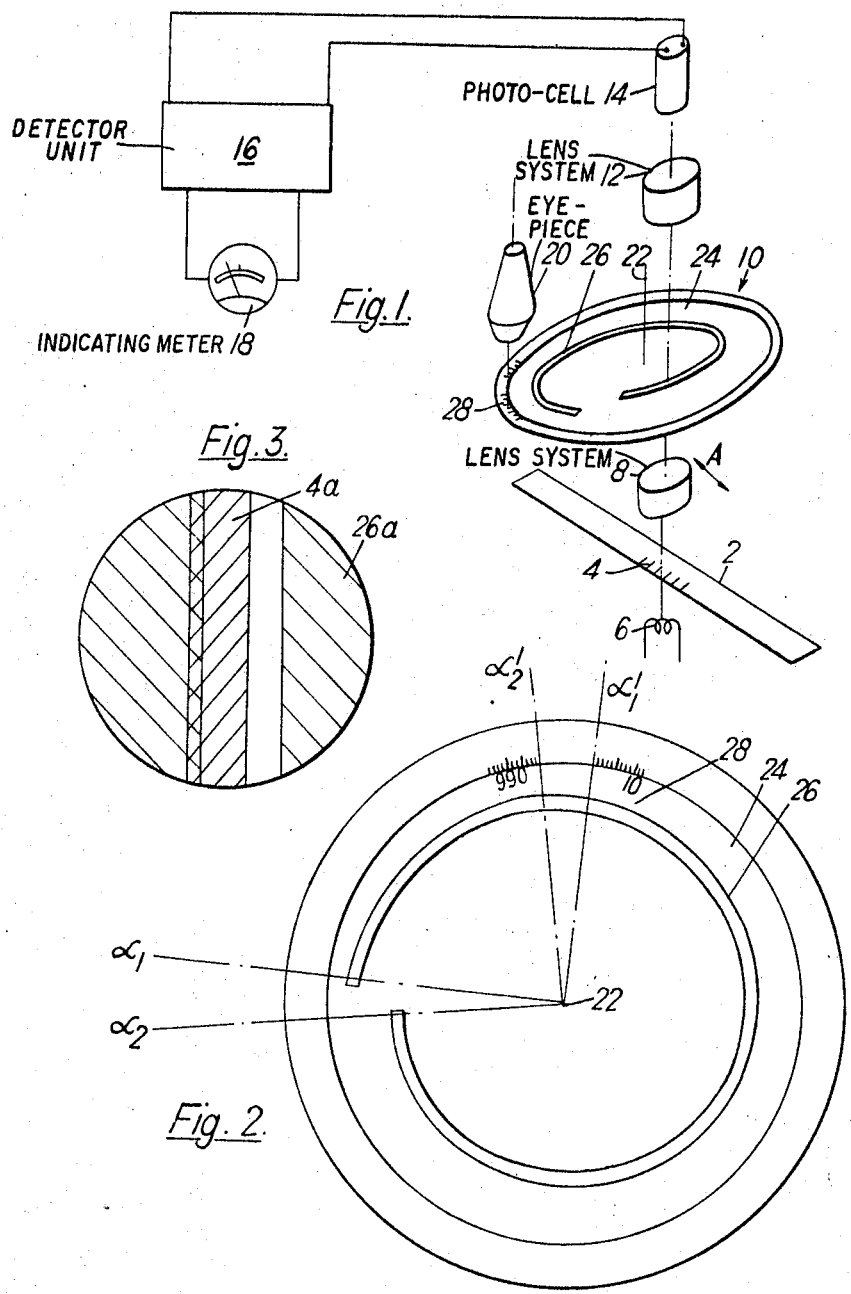

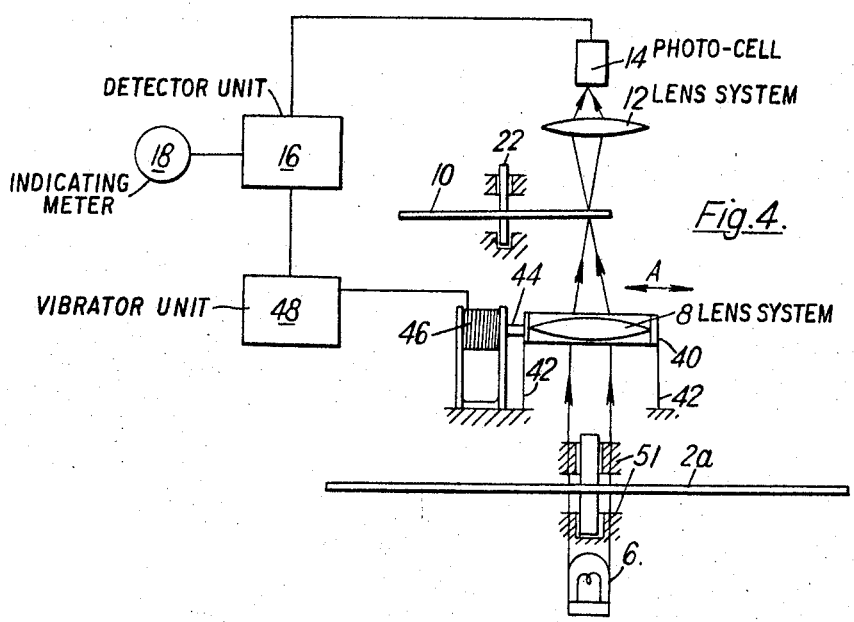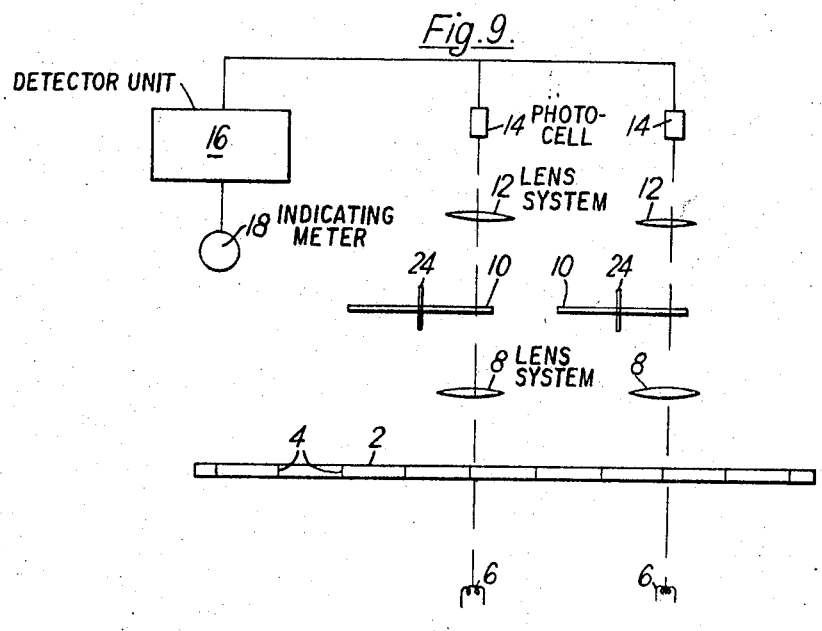

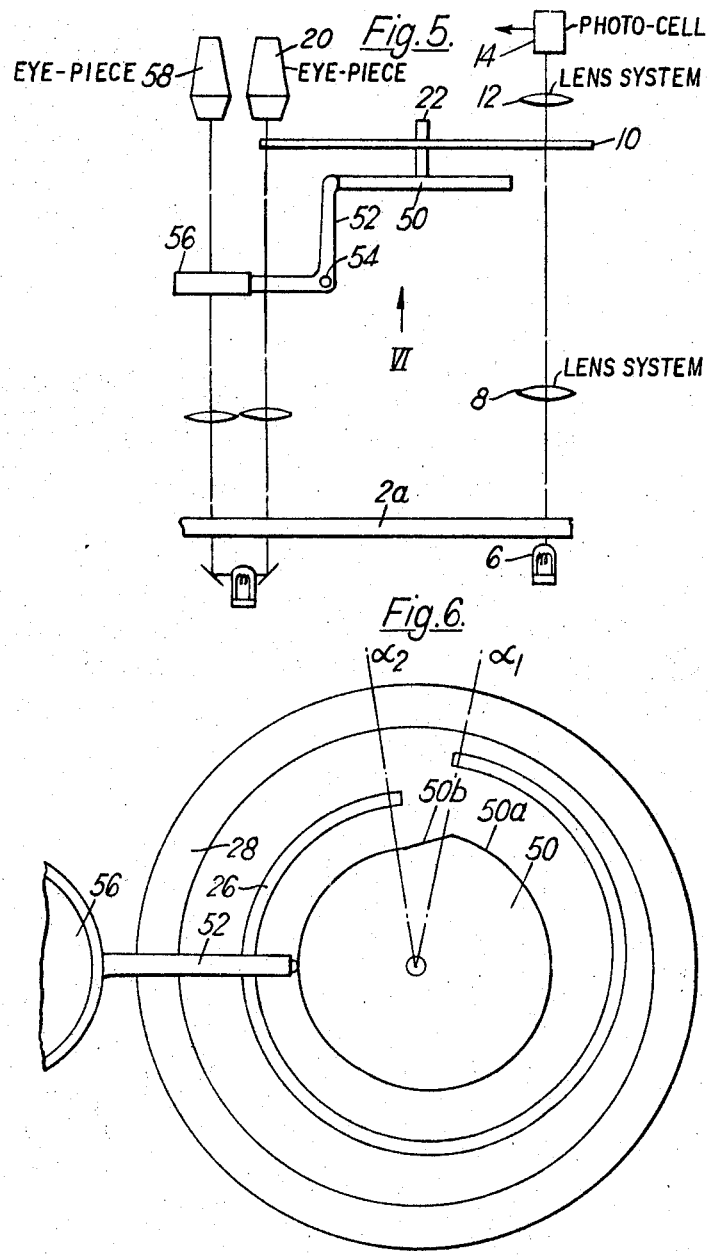

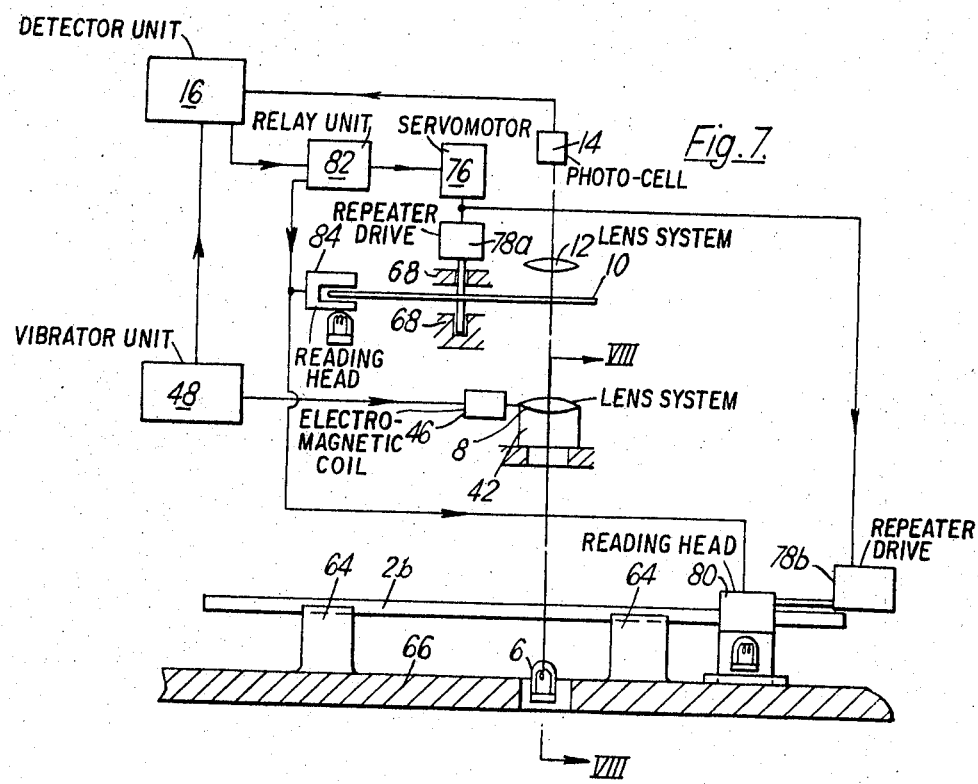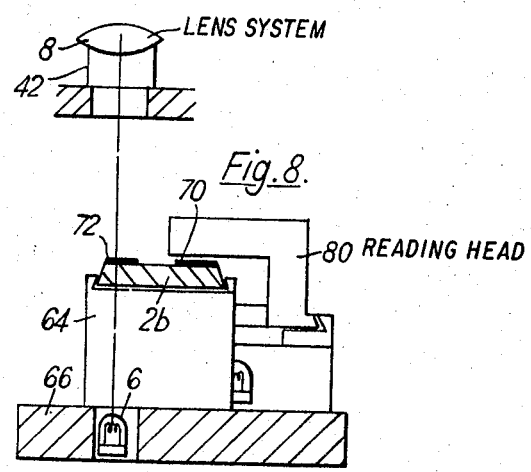

3,453,052
SCALE READING MEANS
Charles John Godfrey, London, England, assignor to Hilger & Watts Limited, London, England, a company of Great Britain and Northern Ireland
Filed June 1, 1964, Ser. No. 371,406
Claims priority, application Great Britain, June 5, 1963, 22,461/63
Int. Cl. G01b *11/04;* G01c *1/06*
U.S. Cl. 356—170                                17 Claims

ABSTRACT OF THE DISCLOSURE

A means of positional measurement employing a combination of coarse and fine scale settings is disclosed herein. The fine scale setting is achieved by use of a spiral graticule in association with the image of a graduation or graduations forming part of or being movable with the coarse scale. Illumination as modified by passage through the graticule is imaged on a photocell to determine centralization between said graduation and that portion of the graticule on which its image falls. The graticule spiral is characterized by having its ends so spaced radially that, as imaged at the photocell, said spacing is less than the spacing of correspondingly imaged successive graduations and the angular extent of the spiral is restricted to less than 360° to facilitate operation. The signals indicating said centralization may be produced in oscillatory form by relative vibration between the spiral graticule and an arrangement using a plurality of spiral graticules to average out scale errors as further disclosed. In one particular arrangement, the achievement of a fine reading setting can be achieved fully automatically with the graticule being continuously rotated until a setting is reached. The apparatus may include deflection means associated with the spiral graticule so that the projected graduation image associated with the coarse scale is held fixed between each incremental measurement step of the coarse scale, regardless of the value of the reading of the fine scale between any such pair of steps.

---

It is well known in the design of measurement devices to provide, for the purpose of increasing their accuracy, separate main and fine reading means.

In one known system, a main scale is observed through a microscope eyepiece and a fine reading is made by means of a spiral graticule rotatable about an axis to one side of and parallel to the microscope axis. The spiral is of Archimedian form, that is to say, it increases in radius in direct proportion to the angular co-ordinate from the axis of rotation and the magnification of the microscope eyepiece is so matched to the spiral that the total change of radial dimension of the spiral, as viewed through the eyepiece, is equal to the observed spacing between the main scale divisions. A circular scale is provided around the spiral graticule and thus, by bringing the images of a portion of the spiral and a main scale graduation into co-incidence, the setting obtained is read off directly from the circular scale.

However, this system is not suitable for automatic reading techniques nor for semi-automatic techniques in which the image pattern is not directly observed but is, for example, employed to operate a meter indicating alignment of the spiral with a graduation, since ambiguity can arise as a reading value approaches that of a main scale graduation.

According to the present invention, there is provided a scale reading means comprising a rotatable spiral graticule indicating a fine scale setting relative to a graduation of a main scale, photo-electric means being provided to determine alignment between said graduation and spiral, said means including a detector to receive a combined image of said graduation and a segmental portion of said spiral, the formation of the spiral being such that the change of radial dimension between its end portions as imaged at the detector is less than the imaged spacing between adjacent graduations of the main scale.

In accordance with the sub-division of measurement required for the fine reading, the effective difference between the images of said radial distance and said graduation spacing would normally be equal to a unit of the fine scale measurement. Thus, ambiguity is avoided, the final reading being produced by an addition of the fine reading to the main scale reading.

The invention will be described with reference to the accompanying drawings wherein:

FIG. 1 illustrates schematically the arrangement of one form of apparatus according to the invention and intended for semi-automatic operation, FIG. 2 shows, in more detail, the graticule disc of the apparatus illustrated in FIG. 1, FIG. 3 shows the general form of the resultant light transmission after passage through the graduated scale and the spiral of the apparatus in FIG. 1, FIG. 4 illustrates schematically apparatus according to the invention in which the graduation and spiral images are vibrated relative to each other, FIG. 5 illustrates a modification of the construction in FIG. 4 in which an image of the coarse scale is deflected to compensate for the incremental displacement associated with the fine scale reading, FIG. 6 is a view in the direction of the arrow VI in FIG. 5, FIG. 7 illustrates schematically a further form of the invention employing digitally coded scales adapted for fully automatic reading, FIG. 8 is a sectional view on the line VIII—VIII in FIG. 7, and FIG. 9 shows, in outline, an embodiment of the invention in which the fine scale reading is obtained using an averaging technique.

Referring to FIG. 1 of the drawings, a longitudinally movable main scale 2 carrying opaque graduations 4 on a transparent ground has a light source 6 behind it, the beam from the source passing through lens system 8 which produces an image of the illuminated portion of the main scale on disc 10. The disc 10 is rotatable about a fixed axis 22 perpendicular to the plane of the scale 2 and has an inner opaque region 24 in which a transparent track is provided by a slit 26 taking the form of an Archimedian spiral. The light path through the track proceeds, through a lens system 12, to a photocell 14 the output from which is fed to a detection circuit 16 to which indicating meter 18 is connected. The required resultant light beam can be produced alternatively by an inverse arrangement, that is to say, the main scale comprising an opaque ground with transparent graduations and the disc comprising a transparent region with an opaque track but the first described arrangement is a preferred one.

FIG. 3 indicates the general form taken by the resultant light signal from the scale and spiral. It will be seen that as the track image 26a and graduation image 4a approach position of symmetry relative to each other, the total intensity of the light passed approaches a minimum or zero value. Observation of this value on the meter 18 provides an indication that the fine setting value has been reached.

The effective ends of the spiral terminate short of the ends of the slot at the angular positions indicated by radial lines $\alpha_1$, $\alpha_2$ (FIG. 2) defining the effective angular extent or effective image producing angular extent of the spiral. This is because, when using photo-electric detection means, the light beam occupies a finite area and the lines $\alpha_1$, $\alpha_2$ coincide with the median of the light beam's circumferential length when it is at the respective end positions of the spiral. The angular extent of the spiral between its effective ends, then, is less than 360°.

The radial spacing of the ends of the spiral is a distance less than that between adjacent divisions of the main scale as the respective magnified images of these two elements are received at the photo-cell. Around the rim of the disc 28 indicates a series of one thousand graduations from which the fine scale setting can be read off against a fiduciary mark through an eyepiece 20 but because of the difference between the spacings of the main scale graduations and the spiral ends a reading can only be obtained up to the 999th graduation. That is to say, since the disc shown is read directly, the angle subtended between radial line $\alpha_1'$ passing through the zero of the scale and radial line $\alpha_2'$ passing through the 999th graduation is equal to the angle subtended by the lines $\alpha_1$, $\alpha_2$.

By this means, it is impossible to obtain an ambiguous reading at the zero position of the scale 28.

The photo-electric signal produced in the reading means is preferably derived in an oscillatory form. For example, by a transverse oscillation of the lens system 8 as indicated by the arrows A in FIGS. 1 and 4, there will be a resultant oscillating signal received by the photo-cell.

It will be evident from FIG. 3 that if the graduation image and the track vibrate relative to each other, the variation in intensity of the resultant light beam passed will depend upon the relative mean positions of the two parts composing that resultant. If they are offset relative to each other, as shown in FIG. 3, the oscillating value will be asymmetrical, a maximum value occurring once in each cycle, but at the position of symmetry two peaks of equal intensity occur in each cycle. Thus, when a correct setting has been achieved the illumination output will include a component having twice the frequency of the lens system oscillation but on either side of this position there will be a component having the same frequency as that oscillation. Moreover, depending upon the sense of the misalignment, this equal frequency component will have its maxima either in the positive or the negative phase of the vibrating oscillation.

It should also be appreciated that reference to a position of symmetry does not necessarily imply geometrical symmetry about a center line for the light transmission it receives. Where such geometrical symmetry cannot be achieved it is still possible to obtain a position of balance and in such a case, the low frequency component will not disappear as the point of balance is reached but will undergo a 90° phase shift which permits it to be filtered out in subsequent processing of the signal.

In FIG. 4 which shows an oscillatory detection arrangement in more detail, the lens system 8 is indicated as a single component in a mounting 40 supported upon leaf springs 42. There may be other optical components present but these can occupy fixed positions. An armature 44 on the mounting is surrounded by an electromagnetic coil 46 receiving its energisation from a vibrator unit 48. The detector 16 in this example takes the form of a discriminator unit which receives a second input from the vibrator unit 48 and can compare this signal with the oscillatory signal that will now be fed from the photocell 14. The presence in that oscillatory signal of a component having the same frequency as the vibrator signal is shown upon the indicating meter 18, the discriminator unit including a phase-conscious circuit to permit the sense of any misalignment to be displayed in the meter reading. It will be noted that in this illustrated example, the main scale 2a is in the form of a circular disc rotatable upon bearings 51.

Using this construction, the indication that the fine scale setting has been achieved can be arrived at by rotating the disc 10 manually until the meter fed from the discriminator unit indicates that the correct setting has been achieved and the scale 28 (not shown in FIG. 4) is then read directly. In a modification of the described disc, the scale 28 can be projected on to a screen or it can have a coded digital form and be read off using conventional means actuated either manually or automatically.

An additional modification that can assist in avoiding ambiguity when reading the main or coarse scale, particularly when such reading is performed photo-electrically, is illustrated in FIGS. 5 and 6. The purpose of the construction illustrated in these figures is to ensure that the main scale image providing the coarse reading is maintained in a predetermined position regardless of the fractional increment in the position of the scale itself that is to be determined through the spiral graticule setting.

FIG. 5 shows a portion of the main scale 2a and the optical parts 8, 12 by means of which the combined graduation/spiral image is directed to the photocell 14. A cam 50 is fixed to rotate with the spiral graticule 10 and has a peripheral surface including a spiral portion 50a that opens with the graticule spiral (but not necessarily at the same rate) and a return portion 50b between the effective ends of the graticule spiral. A bell crank lever 52 is pivoted at 54 and one end bears against the cam 50 while the other end carries an optical plate 56. The rotation of the graticule thereby causes a progressive tilting of the optical plate when the lever bears upon the cam portion 50a, the plate being reset as the return portion 50b passes the lever.

In consequence of the tilting of the plate 56, the image of the main scale observable in eyepiece 58 would move across the field of view. The total travel of the image is matched to its magnification at the eyepiece to counteract the movement that would otherwise be observed as a main scale graduation was displaced through a scale division. Thus, regardless of the angular setting of the gratitude when a reading setting is achieved, that is to say regardless of the fractional increment to be added to the main scale reading, the observed image of the main scale graduations would occupy the same position in the field of view of the eyepiece. As stated above, this is of especial importance when the main scale reading is to be taken photo-electrically since the photo-sensitive elements employed can be arranged to receive their signals from the central portions of the relevant blocks of their respective coded scale tracks. For such a form of reading, it will be appreciated that the main scale will carry two parallel sets of scale markings, one of graduations to determine the required spiral graticule setting and a second in the form of a series of coded tracks from which the main scale setting reading is obtained.

Reading means according to the invention can alternatively be adapted for fully automatic operation, wherein rotation of the disc 10 is effected through the employment of a known servomotor.

Since the angular extent of the spiral is less than 360° it provides, in effect, a shutter which causes the servomotor to continue rotating until a balanced setting has been reached, the movement of the coarse scale image being synchronized with the rotation of the disc as described above. As in the case of manual operation, either a coded digital scale or a direct scale projection can be used for the fine reading and the main scale reading can also be obtained by either of these methods. For example, a rectilinear form digitizer track could be used for the main scale although, the main scale may take other forms such as the circular disc shown in FIG. 4.

An arrangement of the fully automatic kind is illustrated in FIGS. 7 and 8 of the drawings. A main scale 2b can slide along guides 64 on a fixed base 66 and carries a reading scale 70 in digital coded form to give a coarse reading of its position in addition to a graduated scale 72 parallel to the coded scale to be employed in conjunction with the spiral graticule 10. Graticule 10, of the general form shown in FIG. 2, is rotatably mounted upon fixed supports 68 and the upper and lower lens system 12, 8 respectively, are similarly mounted to parts fixed to the base 66. The lamp 6 provides the illumination of the graduated scale and the spiral in the manner described in earlier examples and, similarly to the illustrated embodiment in FIG. 4, vibrator 48 produces a relative oscillation of the image portions at the photocell 14. The output from the detector unit 16 in this example is used to control the motion of a servomotor 76 which is arranged to rotate continuously until the detector unit indicates that a balanced setting has been achieved of the two elements at the photocell, at which point the servomotor drive is locked in position.

The servomotor 76 is conected to repeater drives 78a, 78b which move the spiral graticule and a photoelectric reading head 80, respectively. The graticule is rotated continuously by its drive while the head 80, through the drive 78b, is given a reciprocating movement with a fast return stroke so that, when the angular setting of the graticule has been achieved, regardless of the magnitude of the fine scale increment indicated by that setting, the head 80 has automatically been centered upon the relevant station of the coded scale providing the coarse reading. The function of the drive 78b is entirely analogous to the arrangement of cam and optical plate shown in FIG. 5, the fast return stroke being made during rotation of the graticule portion between the spiral ends through the photocell field of view.

Once the setting position is reached, the detector unit feeds an actuating output signal to a relay unit 82 which is operated thereby to arrest the servomotor in position and to transmit impulses to the main scale reading head 80 and a similar reading head 84 on the spiral graticule, the readings of these heads then being displayed or recorded, on punched tape for example, by conventional means (not shown). It is possible alternatively to employ the relay unit solely to hold the servomotor in position and to actuate the reading heads through a manual control.

To improve the accuracy of the readings, it is possible to provide two or more spirals each of which is associated with a separate main scale graduation; this is illustrated in FIG. 9, which shows a pair of graticules 10 arranged in parallel, their axes 24 being at a distance apart equal to an integral number of graduations 4 on the main, coarse scale 2. Each graticule has associated with it, its own illumination source 6, lens systems 8, 12 and photocell 14 but the single detector unit 16 receives the summated signal generated by the photocells. By receiving a combined signal at the detector through all the spirals and their associated graduations simultaneously, any errors in the production of the spiral or the main scale will be averaged and their effect on the resultant reading reduced. This is of particular advantage where a circular main scale is employed since, by taking simultaneous readings from diametrically opposite portions of the scale, centring error can be eliminated.

By enabling semi- or fully automatic reading techniques to be employed, the invention is able to increase the efficiency of such operations both in speed and in accuracy. Thus, eye fatigue is no longer a limiting factor, while averaging methods, which are beyond the capabilities of direct visual performance, can be readily applied.

What I claim and desire to secure by Letters Patent is:

1. Scale reading means comprising, in combination, a main scale having a plurality of linear graduations, a graticule having a spiral track rotatable on an axis perpendicular on an axis perpendicular to the plane of the main scale and carrying an arcuate fine scale concentric with said axis, first focussing means between the main scale and the graticule and a light source on the side of the main scale remote from the graticule to produce an image of one graduation upon the graticule, second focussing means in the path of the illumination prassed by the graticule and directing an image of said illumination to a photo-electric device which therdeby receives a combined image of the graduation and a portion of the spiral track, the change in radial dimension between opposite end portions of the spiral track as imaged at the device being less than the corresponding imaged spacing of adjacent graduations of the main scale and the spiral track having an effective image producing angular extent of less than 360° between the end portions thereof, detection and indicating means being connected to the photo-electric device to determine the centrality of the two parts of said image relative to each other and thereby to indicate the achievement of a reading setting of the graticule fine scale.

2. Scale reading means according to claim 1 wherein the spiral track is of Archimedian form.

3. Scale reading means according to claim 1 wherein the main scale graduations are opaque and are on a transparent ground and wherein said spiral track is a transparent track in an opaque ground.

4. Scale reading means according to claim 1 wherein the main scale graduations are transparent in an opaque ground and track is an opaque track on a transparent ground.

5. Scale reading means according to claim 1 wherein the main scale is of rectilinear form.

6. Scale reading means according to claim 1 wherein the main scale is of circular form.

7. Scale reading means comprising, in combination, a coarse scale having a series of equally spaced linear graduations, a rotatable spiral graticule carrying an angular fine scale, illumination means directing a light pattern from said coarse scale graduations through focussing means to form an image thereof in the plane of said rotatable spiral graticule such that movement of the coarse scale produces a movement of said image in a radial direction relative to the axis of rotation of said graticule, vibration means connected to an element of said focussing means for oscillating said image in said radial direction and for providing an oscillatory signal in synchronism with the oscillation of said element of said focussing means, further focussing means and a photo-electric cell located in succession along an optical path beyond the graticule, the further focussing means producing on the cell an image of the resultant light pattern from said graduations and the conjointly illuminated portion of said spiral, electrical discriminator means receiving the photo-electric cell output signal and said oscillatory signal from the vibration means, said discriminator means comprising means for comparing the vibration means signal with the variation of an oscillatory mode of the resultant light pattern with angular movement of the spiral graticule, the usable image producing angular extent of the spiral of the graticule occupying an angle of less than 360° between its opposite end portions and being such that the change in radial dimension due to said angular movement, as imaged at the cell, between its opposite end portions is less than the correspondingly imaged spacing of successive graduations of the coarse scale.

8. Scale reading means according to claim 7 including a further spiral graticule, both said graticules being provided on parallel axes spaced along the extent of the coarse scale at distances which are integral multiples of the coarse scale graduations, photo-electric cell means including said photo cell, the respective light patterns from the spirals and their associated graduations being received by said photo-electric means for delivering an output signal dependent upon the instantaneous summated pattern intensities to said discriminator means, and means for providing an average reading of the angular positions assumed by the respective graticules.

9. Position measurement means comprising, in combination, a coarse scale member having a series of linear graduations and an arcuate-form fine scale upon a rotatable graticule member and occupying an angular space of less than 360° of said graticule member, a spiral graticule on said member, illuminated image-forming system means for producing an image of at least one graduation on the graticule member and vibrator means actuating an element in the path of said image-forming system means to produce a relative radial oscillation between the graticule axis and said image and providing a reference signal, photoelectric cell means for producing an electric signal, light transmission means for directing the resultant combined illumination pattern of said oscillatory image as modified by projection through the spiral graticule to said photo-electric cell means when the coarse scale has taken a required setting, electrical discriminator means receiving said reference signal from the vibrator means, the electrical signal from the photo-electric cell means being directed to said discriminator means receiving said reference signal from the vibrator means, said discriminator means comprising means for responding to an oscillating electrical component in the cell signal having the frequency of said vibrator input for detecting non-centrality of the illuminated spiral portion relative to the produced graduation image line, the radial distance between opposite end portions of the spiral, as detected at the photo-electric cell being less than the correspondingly measured distance between successive coarse scale line settings.

10. Means according to claim 9 wherein a digital coded scale is provided on the coarse scale member parallel to said linear graduations and photo-electric reading means are provided in association with the coded scale for determining the setting of the scale member, further drive means being provided connected to the graticule member for movement in synchronism with the graticule rotation to cause relative movement between said reading means and the coded scale image projected upon said means whereby, at any given coarse scale reading, the reading means and image occupy a predetermined relative position independent of the fractional incremental displacement of the coarse scale member producing the fine scale reading.

11. Means according to claim 10 wherein said further drive means includes a cam rotatably fixed to the graticule member, an optical element located in the light path between the coded scale and the reading means being movably mounted upon a mechanical linkage including a follower for said cam, rotation of the cam thereby moving said element and displacing the scale image upon the reading means in dependence upon the angular position of the graticule member.

12. Scale reading means comprising, in combination, a member carrying parallel scales, one of the scales being a series of linear graduations and the other being a plurality of coded digital tracks, fixed illumination means in association with focussing means to produce an image of at least one of the linear graduations, a spiral graticule rotatable in the plane of the image carrying an arcuate fine scale the spiral graticule having an effective angular extent of less than 360° about its axis of rotation, the member being movable along the extent of its scale to produce a displacement of said image in a radial direction relative to the graticule axis, vibratory means for actuation by an actuating signal for oscillating the image in said radial direction, optical means in the path of the resultant light pattern through the spiral graticule directing said pattern to photo-electric means generating an alternating electrical output dependent upon the fluctuating illumination intensity received thereby, detection means having respective inputs from the photo-electric means output and the vibratory means actuating signal, said detection means comparing said inputs to determine the achievement of a central positioning of a spiral portion image relative to a graduation of said one scale, reading means for said other scale including a read-off head movable relative to the extent of the member and a mechanism connected to the spiral graticule controlling relative movement between the head and said other scale image received by the head, said relative movement being maintained by the member proportional to the angular setting of the spiral graticule so that the relevant portion of said other scale forms an image located at a fixed position for any incremental fine scale setting, the radial distance between opposite end portions of the spiral, as detected at the photo-electric means, being less than the image dimension at said means of the spacing between successive linear graduations of said one scale.

13. Means according to claim 12 wherein drive means are connected to the graticule for continuously rotating the graticule and a relay means being provided for receiving an output signal from the detection means when said detection means indicates a central positioning has been achieved, said relay means operatively connected to the drive means and, in response to said signal, arresting the drive means to maintain said central positioning.

14. Means according to claim 13 wherein the graticule fine scale comprises a plurality of optical coded tracks and a photo-electric read-off head is provided for reading said fine scale, said relay unit including connections to the coarse and fine scale read-off heads for triggering the taking of readings by said heads when the drive means have been locked in position.

15. Scale reading means comprising, in combination, a coarse scale and a plurality of arcuate fine scales rotatable on respective, paralle axes directed perpendicuar to the plane of the coarse scale and spaced along the extent of the coarse scale which carries a correspondingly spaced series of graduations, a spiral graticule fixed to each fine scale and having an effective extent less than 360° about its axis of rotation, respective illumination means and focussing means associated with the coarse scale for each of the fine scales to produce an image of respective portions of the coarse scale at the spiral graticules, light transmission means directing the resultant illumination pattern projected through each graticule to a photo-electric detection means associated with each graticule, electronic evaluation means for receiving a signal formed by the combined transmissions from all the graticules for determining the variations in said signal with synchronous angular movement of the graticules and for providing a mean measure of the angular settings of the graticules, the imaged movement of each graticule between opposite end portions of its spiral at said photo-electric means being less than the corresponding movement associated with successive incremental measurements of the coarse scale.

16. In means for obtaining a fine reading of a coarse scale setting, the combination comprising a coarse scale having linear marks thereon, focussing means, illumination means associated with said focussing means for producing an image of a linear mark on said coarse scale, a spiral graticule rotatable in the plane of said image, said graticule carrying an angular fine scale for the fine reading, further focussing means in the path of the resultant light emission through the graticule for forming a combined image of the graduation and a linear portion of the spiral, a photo-electric cell means located at the focal point of said combined image and electronic evaluation means for receiving the signal generated in the cell by said image for determining the variation in said signal with angular movement of the graticule and providing an indication of the graticule angular setting for the fine reading on the angular scale, the radial distance between opposite ends of the spiral as imaged at the photo-electric cell being less than the corresponding image from the coarse scale at successive reading settings of the coarse scale and the effective angular extent of the spiral and its associated fine scale being less than 360°.

17. Means according to claim 16 wherein vibrator means providing an electrical signal is connected to an optical element in the light path between the coarse scale and the graticule to oscillate the image of said coarse scale mark radially upon the graticule, said electronic evaluation means including means for receiving said electrical signal from the vibrator means in phase with the oscillation provided thereby and including a phase-sensitive circuit means responsive to the elimination of any components in the cell signal having a corresponding frequency to said oscillation both in phase therewith and 180° out of phase therewith for indicating the achievement of a fine setting position for said graticule.

References Cited

UNITED STATES PATENTS

| | | |
|---|---|---|
| 2,375,665 | 5/1945 | Koulicovitch. |
| 2,959,087 | 11/1960 | Strickland. |
| 3,098,152 | 7/1963 | Von Mathes. |
| 3,076,374 | 2/1963 | Neergaard. |
| 3,167,605 | 1/1965 | Heidenhain. |
| 3,205,364 | 9/1965 | Pong. |
| 3,254,227 | 5/1966 | Hock. |

FOREIGN PATENTS

| | | |
|---|---|---|
| 156,689 | 12/1963 | Russia. |
| 999,123 | 10/1951 | France. |
| 574,295 | 12/1945 | Great Britain. |
| 121,184 | 10/1959 | Russia. |

RONALD L. WIBERT, *Primary Examiner.*

T. MOHR, *Assistant Examiner.*

U.S. Cl. X.R.

356—139